(12) United States Patent
Miller et al.

(10) Patent No.: US 11,022,761 B2
(45) Date of Patent: Jun. 1, 2021

(54) NON-CONTACT INSERTION LOSS MEASUREMENT SYSTEMS FOR OPTICAL FIBER CABLE ASSEMBLIES

(71) Applicant: CORNING RESEARCH & DEVELOPMENT CORPORATION, Corning, NY (US)

(72) Inventors: William James Miller, Horseheads, NY (US); Robert Adam Modavis, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 30 days.

(21) Appl. No.: 16/673,766

(22) Filed: Nov. 4, 2019

(65) Prior Publication Data

US 2020/0064557 A1  Feb. 27, 2020

Related U.S. Application Data

(63) Continuation of application No. PCT/US2018/031962, filed on May 10, 2018.

(60) Provisional application No. 62/505,428, filed on May 12, 2017.

(51) Int. Cl.
*G01N 21/00* (2006.01)
*G02B 6/38* (2006.01)
*G01M 11/00* (2006.01)

(52) U.S. Cl.
CPC .............. *G02B 6/385* (2013.01); *G01M 11/33* (2013.01)

(58) Field of Classification Search
CPC ........... G01M 11/3145; G01M 11/335; G01M 11/33; G01M 11/3109; G01M 11/338

USPC ........................................................ 356/73.1
See application file for complete search history.

(56) References Cited

U.S. PATENT DOCUMENTS

| 5,367,372 | A  | 11/1994 | DiVita et al. |
| 8,908,167 | B2 | 12/2014 | Flora et al. |
| 10,161,829 | B2 | 12/2018 | Brillhart et al. |

(Continued)

FOREIGN PATENT DOCUMENTS

EP        3121581 A1    1/2017

OTHER PUBLICATIONS

International Search Report and Written Opinion of the International Searching Authority; PCT/US2018/031962; dated Nov. 28, 2019; 24 pages; European Patent Office.

(Continued)

*Primary Examiner* — Md M Rahman
(74) *Attorney, Agent, or Firm* — Adam R. Weeks (57) ABSTRACT

A non-contact system for measuring an insertion loss of a cable assembly with cable fibers includes a light source system that emits light and a launch connector supporting launch fibers. A detector system includes receive fibers supported by a receive connector. The detector system has detectors optically coupled to the receive fibers, with one detector directly optically coupled to the light source system for calibration. A first movable stage supports the launch connector and a second movable stage supports the receive connector. A launch optical system images output end faces of the launch fibers onto input end faces of the cable fibers of the cable assembly. A receive optical system images output end faces of the cable fibers onto input end faces of the receive fibers. The light exiting the receive fibers is detected and processed to determine the insertion loss of the cable assembly.

16 Claims, 5 Drawing Sheets

(56) References Cited

U.S. PATENT DOCUMENTS

2006/0209290 A1    9/2006    Suzuki et al.

OTHER PUBLICATIONS

Invitation to Pay Additional Fees From the International Searching Authority; PCT/US2018/031962; dated Aug. 14, 2018; 16 pages; European Patent Office.
Marcuse; "Loss Analysis of Single-Mode Fiber Splices," BSTJ, vol. 56, No. 5, p. 703, (1977).

NON-CONTACT INSERTION LOSS MEASUREMENT SYSTEMS FOR OPTICAL FIBER CABLE ASSEMBLIES

CROSS-REFERENCE TO RELATED APPLICATIONS

This application is a continuation of International Application No. PCT/US18/31962, filed on May 10, 2018, which claims the benefit of priority to U.S. Application No. 62/505,428, filed on May 12, 2017, both applications being incorporated herein by reference in their entireties.

FIELD

The present disclosure relates to optical fiber metrology, and in particular relates to non-contact insertion loss measurement systems and methods for optical fiber cable assemblies.

BACKGROUND

Optical fibers are used for a variety of applications that require the transmission of large amounts of information over short, medium, and long distances. The optical fibers are typically carried in cables, which can be single-fiber cables or multifiber cables. One or both ends of an optical cable may be terminated by an optical fiber connector, thereby forming a cable assembly. Short cable assemblies that are often used to connect one piece of equipment to another within a room or a data center are commonly referred to as jumpers (or "jumper cables"). Long cables (or long cable assemblies) that are often used to connect one data center to another data center are commonly referred to as long-haul cables, trunks, or backbones.

One of the properties used to characterize the optical fiber(s) supported in the various types of cables is their ability to transmit light. This is usually determined by measuring an amount of attenuation or loss of light transmitted over a given distance of the optical fiber. This loss is known as insertion loss.

One of the problems associated with making insertion loss measurements for the individual optical fibers in a cable assembly such as a jumper is how to do it quickly and without damaging the end faces of the optical fibers. The most commonly used insertion loss measurement techniques require making contact between the end faces of launch fibers and the end faces of the optical fibers in the jumper being tested. This contact is undesirable because it risks damaging the optical fibers of the cable under test.

An alternate method developed to avoid making contact with the end faces of the optical fibers under test is to cut a section of the optical fiber and then measure the cut section. However, this method adds extra steps to the measurement process and furthermore cannot be used to measure optical fibers in jumpers because their entire length must be preserved.

Another problem with the existing contact-based measurement systems and methods is the consumption of premium source jumpers ("reference jumpers" or "golden jumpers") used to optically connect to the optical fibers being measured. These reference jumpers are costly and wear through use and must be replaced regularly to insure optimal measurement conditions. Eliminating the need for reference jumpers or the need to frequently replace them would reduce overall measurement costs. Yet another problem is false high loss measurements due to source fiber damage.

SUMMARY

Aspects of the disclosure are directed to systems for and methods of making a non-contact measurement of the insertion loss of a cable assembly. Here, "non-contact" means that the end faces of each optical fiber in the cable assembly do not make physical contact with the end faces of any other optical fibers (e.g., launch fibers and/or receive fibers) during the measurement. Instead, light from a launch fiber is imaged onto an input end of an optical fiber of the cable assembly by a first optical system while the light outputted from an output end of the optical fiber of the cable assembly is imaged onto an input end of an associated receive fiber by a second optical system. The light from the receive fiber is then transmitted to a detector (e.g., a detector element) that is part of detector array to detect the amount of power transmitted through the system. Aspects of the disclosure including transmitting light simultaneously through multiple optical fibers of the cable assembly, and then detecting the transmitted light in parallel with multiple detectors.

The procedure for determining the insertion loss takes into account the magnitude and the direction of the fiber offset error as well as mode field sizes for the launch and receive fibers and the cable assembly fibers since these parameters contribute to the overall insertion loss of the cable assembly. With the knowledge of these parameters, an accurate estimate of the total insertion loss in a concatenation of many cable assemblies can be determined directly, as opposed to just summing the individual losses (either linearly or in a root-mean square (RMS) fashion) of all the individual cable assemblies in the concatenation.

Thus, an embodiment of the disclosure includes a non-contact system for measuring an insertion loss of a cable assembly having at least one optical fiber with input and output end faces respectively supported by input and output connectors. The non-contact system comprises a light source system that includes at least one light source that emits light, at least one launch fiber optically coupled to the at least one light source, and a launch connector supporting the at least one launch fiber, wherein each of the at least one launch fiber includes an output end face at the launch connector. The non-contact system also comprises a detector system that includes at least one receive fiber having an input end face and an output end face, a receive connector supporting the input end face of the at least one receive fiber, and a detector array comprising a plurality of detectors, wherein at least one of the detectors is optically coupled to the output end face of the at least one receive fiber and at least another one of the detectors is optically coupled to the light source system via an optical path that does not include the receive connector. Additionally, the non-contact system comprises: a first movable stage that supports the launch connector; a second movable stage that supports the receive connector; a launch optical system for imaging the output end face of the at least one launch fiber onto the input end face of the at least one optical fiber of the cable assembly; and a receive optical system for imaging the output end face of the at least one optical fiber of the cable assembly onto the input end face of the at least one receive fiber. Stated differently, the launch optical system is configured to image the output end face of the at least one launch fiber onto the input end face of the at least one optical fiber of the cable assembly when the input connector is arranged adjacent the launch optical system, and the receive optical system is configured to image the output end face of the at least one optical fiber of the cable assembly onto the input end face of the at least one receive fiber when the output connector is arranged adjacent the receive optical system.

Another embodiment of the disclosure includes a non-contact system for measuring an insertion loss of a test cable assembly having multiple test optical fibers respectively supported by input and output connectors. The multiple test optical fibers each have input and output end faces at the respective input and output connectors. The non-contact system includes: a light source system comprising a launch connector that supports multiple launch fibers each having an output end face, wherein the light source system is configured to generate light at a select wavelength and input the light into the multiple launch fibers; a detector system comprising a receive connector that supports multiple receive fibers each having input and output end faces, and further comprising a plurality of detectors respectively optically coupled to the output end faces of the receive optical fibers, and a reference detector optically coupled directly to the light source system; first and second movable stages for respectively supporting and moving the launch and receive connectors (e.g., laterally moving) the launch and receive connectors; a launch optical system for imaging the output end faces of the multiple launch fibers onto the respective input end faces of the multiple test optical fibers; and a receive optical system for respectively imaging the output end faces of the multiple test optical fibers onto the input end faces of the receive optical fibers. With such a system, the input and output end faces of the test jumper fibers are not in physical contact with any other optical fibers when the insertion loss of the test cable assembly is being measured using the system.

Another embodiment of the disclosure includes non-contact system for measuring insertion loss. The system includes: a cable assembly having multiple cable optical fibers each having input and output end faces respectively supported by input and output connectors; a light source system that emits light and comprises a launch connector that supports multiple launch fibers, wherein each of the multiple launch fibers includes an output end face at the launch connector; a detector system comprising a receive connector that supports multiple receive fibers each having an input end face and an output end face, and further comprising a plurality of detectors respectively optically coupled to the output end faces of the receive fibers, with one of the detectors optically coupled to the light source system via an optical path that does not include the receive connector; a first movable stage that supports the launch connector; a second movable stage that supports the receive connector; a launch optical system configured to image the output end faces of the launch fibers onto the input end faces of the multiple cable fibers when the input connector is arranged adjacent the launch optical system; and a receive optical system configured to image the output end faces of the multiple cable optical fibers onto the input end faces of the receive fibers when the output connector is arranged adjacent the receive optical system.

Another embodiment of the disclosure includes a method of measuring an insertion loss IL of at least one test optical fiber having input and output ends supported by respective input and output connectors. The method includes: a) performing a calibration using a reference jumper having at least one reference jumper fiber to determine: i) a launch mode field diameter (MFD) and a launch zero offset position at a first end of the reference jumper fiber; ii) a receive MFD and a receive zero offset position at a second end of the reference jumper fiber; and iii) an amount of launch power, wherein the reference jumper contributes to the insertion loss IL an amount of loss $P_{IL}$; b) determining for the at least one test optical fiber an input MFD and an output MFD and input and output lateral offsets without the input and output ends of the at least one test optical fiber making physical contact with any other optical fibers; c) calculating a difference between the input MFD and the launch MFD to determine an input coupling efficiency $\eta_{IN}$ that includes a first amount of lateral offset loss, and calculating a difference between the output MFD and the receive MFD to determine an output coupling efficiency $\eta_{OUT}$ that includes a second amount of lateral offset loss; and d) calculating the insertion loss $IL=\eta_{IN}+\eta_{OUT}+P_{IL}$ for the at least one test optical fiber.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

Cartesian coordinates are shown in some of the Figures for the sake of reference and are not intended to be limiting as to direction or orientation.

The acronym MFD used below stands for "mode field diameter" as measured using the Petermann II method, which is the current international standard measurement technique for measuring the MFD of an optical fiber.

Jumpers

Figure 1A:
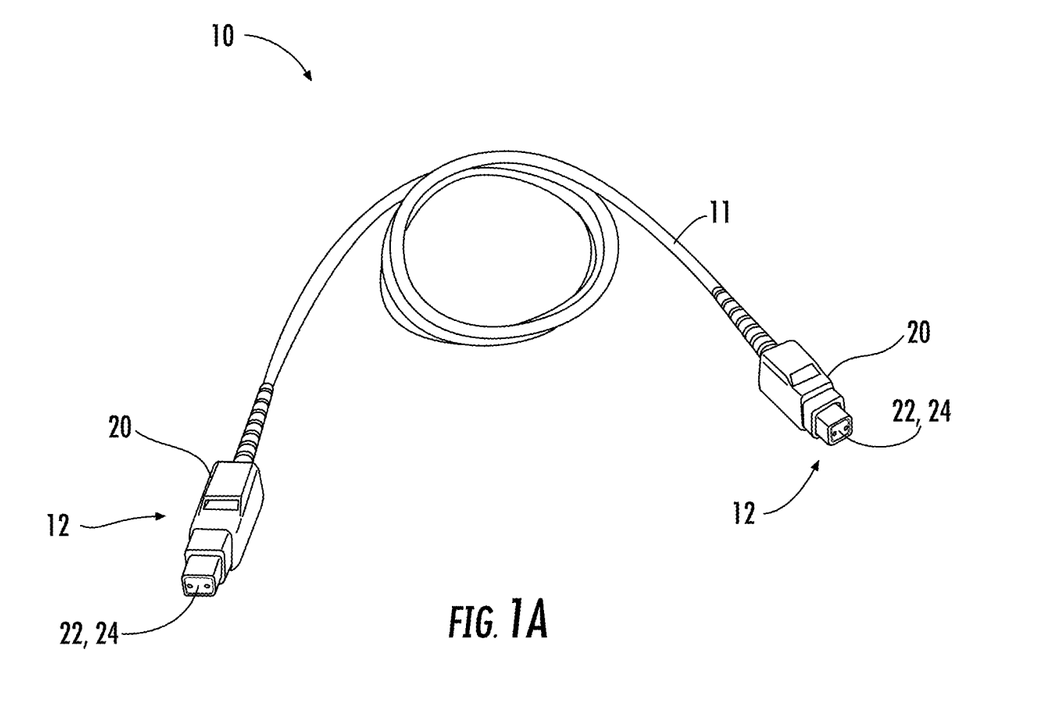
FIG. 1A is an elevated view of an example cable assembly that can be tested using non-contact insertion loss measurement systems disclosed herein, wherein the cable assembly is in the form a jumper having a connector ("jumper connector") on each of its ends.
Figure 1B:
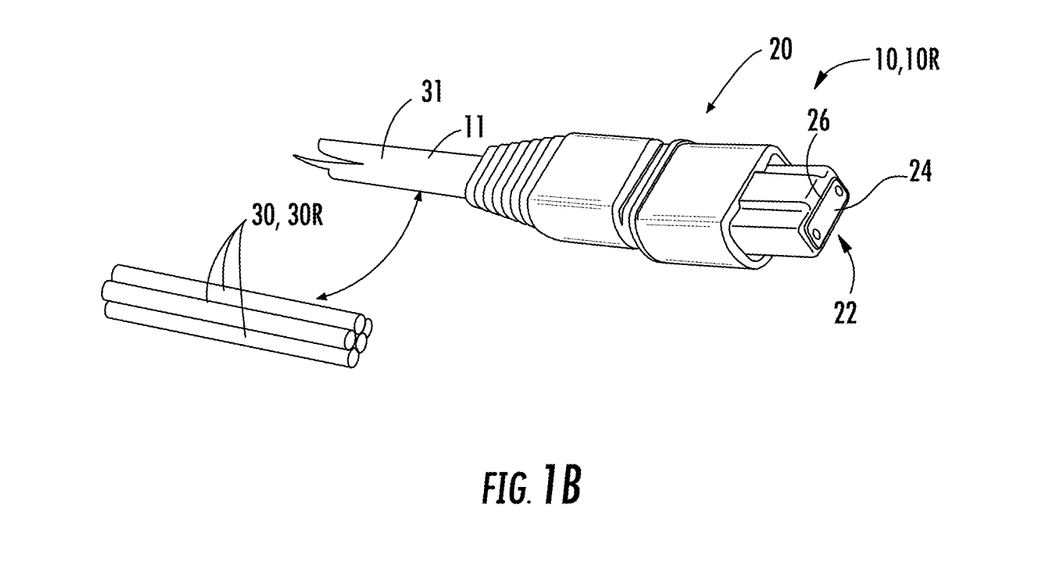
FIG. 1B is a close-up elevated view of one of the jumper connectors of the jumper of FIG. 1A.

FIG. 1A is an elevated view of an example cable assembly 10 that can be tested using the non-contact insertion loss measurement system disclosed herein. The cable assembly 10 includes a cable 11 having first and second opposite ends 12 respectively terminated by first and second optical fiber connectors 20. Thus, the cable assembly 10 can be used as a "jumper" and will be referred to as such in the description below, even though this disclosure may be applicable to other types of cable assemblies. For consistency, the cable 11 will be referred to as "jumper cable 11" and the optical connectors 20 will be referred to as "jumper connectors 20." An example jumper connector 20 is shown in the close-up view of FIG. 1B. Although shown as a multifiber connector, the jumper connectors 20 may be single fiber connectors in some embodiments. Each jumper connector 20 has an end 22 that includes an end surface 24. In an example, the end surface 24 is defined by a ferrule 26.

Figure 1C:
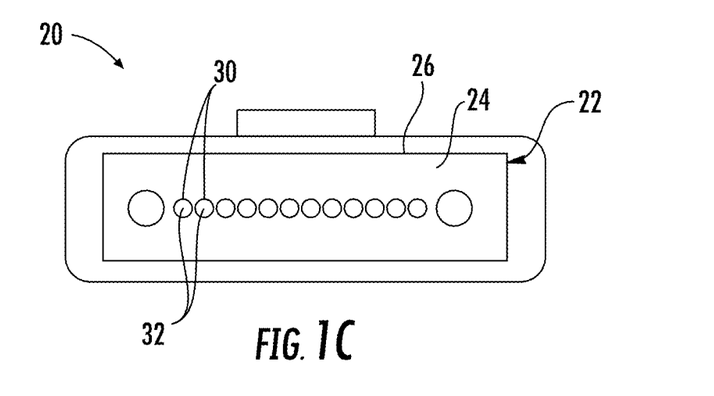
FIG. 1C is an end-on view of the jumper connector of FIG. 1B, illustrating an example 1×12 configuration of jumper fibers at the end surface of the jumper connector.
Figure 1D:
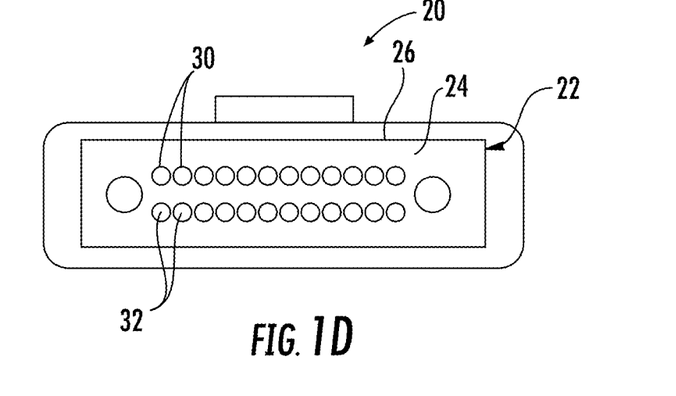
FIG. 1D is similar to FIG. 1C and illustrated an example 2×12 configuration of jumper fibers at the end surface of the jumper connector.

The cable 11 of the jumper 10 supports at least one optical fiber (i.e., a test fiber or cable fiber or as used hereinbelow, a "jumper fiber") 30 in a protective jacket (cable jacket) 31. In an example, the cable 11 supports multiple (i.e., integer)) jumper fibers 30 arranged at the first and second jumper connectors 20 in p rows and q columns (p×q), such as 1×8 (J=8), 1×16 (J=16), 2×16 (J=32), 1×12 (J=12), 2×12 (J=24), 4×12 (J=48), etc. FIG. 1C is an end-on view of one of the jumper connectors 20 and shows an example of a 1×12 arrangement of the jumper fibers 30 at the end surface 24 of the jumper connector 20. FIG. 1D is similar to FIG. 1C, but shows an example of a 2×12 arrangement of the jumper fibers 30 at the end surface 24 of the jumper connector 20. Each jumper fiber 30 has first and second end faces 32 that terminate at or proximate to the respective ends surfaces 24 of the first and second jumper connectors 20. In an example, the jumper cable 11 can include multiple jumper fibers 30 formed as a ribbon using matrix material, and the cable jacket 31 can have an elongate cross-sectional shape.

The jumper connectors 20 as well as the other multifiber connectors mentioned herein can be of the type known and used in the art of optical connectivity, such as multifiber push-on/pull-off (MPO) connectors. The jumper fibers 30 can be single mode fibers, multimode fibers, "universal" mode fibers, or other types of optical fibers. The jumper 10 that is being measured is referred to herein as the "jumper under test" or "test jumper." The discussion below also mentions a reference jumper, also referred to herein as a "golden jumper," which is denoted 10R and has reference jumper fibers 30R (see FIG. 1B). The reference jumper 10R is a jumper that has already been measured and carefully characterized so that it can be used to establish a baseline or reference measurement. In particular, a reference or golden jumper 10R has accurately known jumper fiber positions, MFDs at the input and output ends, and insertion losses for all the jumper fibers 30 supported therein.

The two jumper connectors 20 at the opposite ends of the jumper 10 can be referred to as an input or an output jumper connector, depending on how the jumper 10 is arranged in system 100, as described below. Likewise, the first and second end faces 32 of a jumper fiber 30 can be referred to as input and output end faces, depending on the direction of travel of light passing through the jumper fiber.

Measurement System

Figure 2:
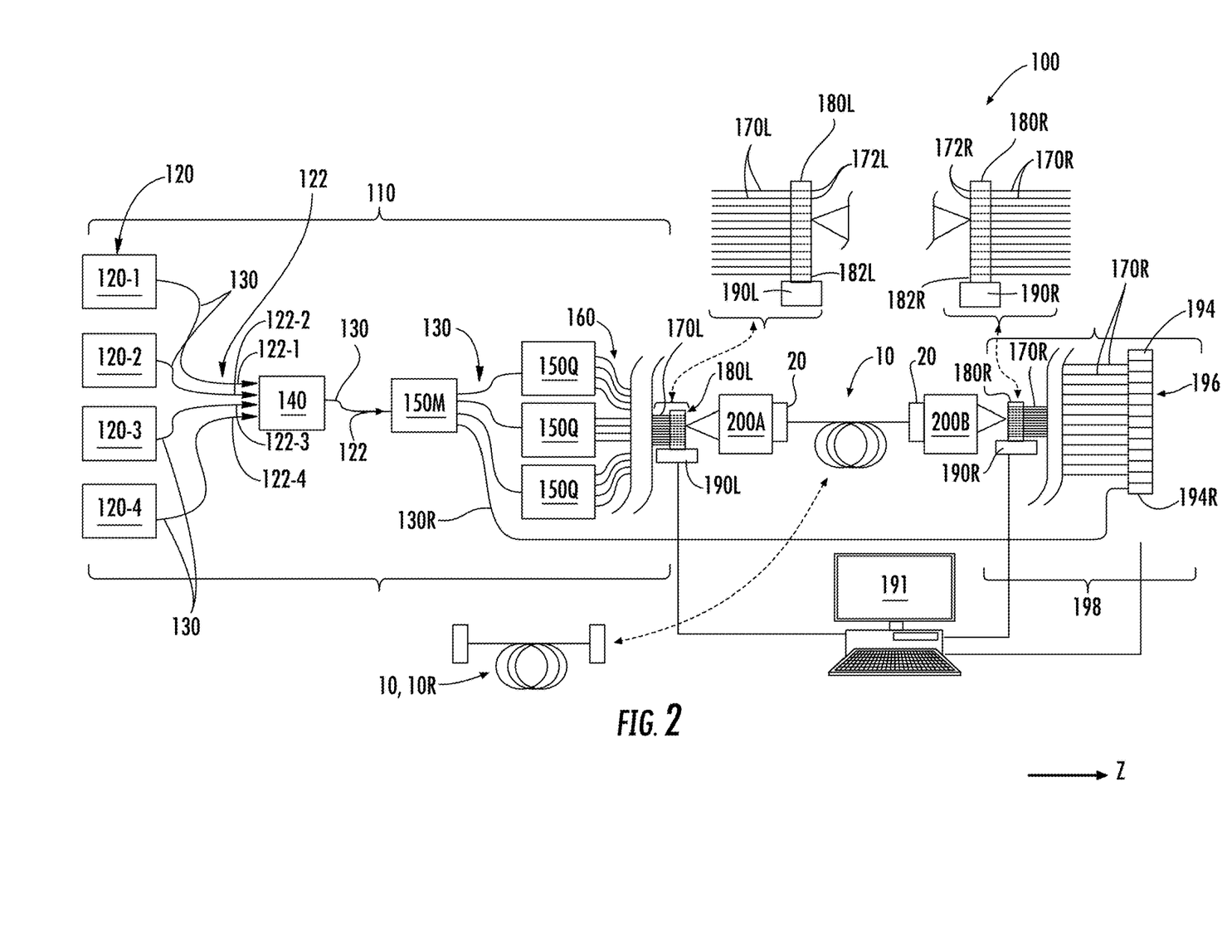
FIG. 2 is a schematic diagram of a non-contact insertion loss measurement system for measuring the insertion loss of a cable assembly such as the jumper shown in FIG. 1A.

FIG. 2 is a schematic diagram of a non-contact insertion loss measurement system ("system") 100 for measuring the insertion loss of a (test) jumper 10 as described above. System 100 has a light source system 110 that includes at least one light source 120 that emits light 122. In an example, the light source system 110 includes a first light source 120-1 that emits light 122-1 having a first wavelength $\lambda 1$ and a second light source 120-2 that emits light 122-2 having a second wavelength $\lambda 2$. For example, the first wavelength $\lambda 1$ may be 1550 nm or about 1550 nm (e.g., 1550 nm±50 nm) and the second wavelength $\lambda 2$ may be 1310 nm or about 1310 nm (e.g., 1310 nm±50 nm). The light source system 110 can also include additional light sources (e.g., light sources 120-3 and 120-4 that respectively operate at different wavelengths $\lambda 3$ and $\lambda 4$) to further characterize the wavelength-dependence of the insertion loss measured using the system 100. The wavelength-dependence of the insertion loss can be used, for example, to assess whether macrobending losses are present in the jumper 10. In an example, the at least one light source 120 comprises at least one laser. The at least one light source 120 can alternatively or additionally comprise at least one narrow-band light-emitting diode (LED) or even a relatively broad-band light source (e.g., a white light source) that is spectrally filtered.

Each of the light sources 120 in the light source system 110 is optically connected via respective optical fiber sections 130 (e.g., respective optical fibers of short length) to a 1×N switch 140, where N is the number of light sources being used (e.g., N=4 for the example of four light sources 120-1 through 120-4). The 1×N switch 140 is optically connected via another optical fiber section 130 to a 1×M coupler 150M configured to divide the light 122 of the selected output wavelength M ways, e.g., M=4 ways as shown. The 1×M coupler 150M is in turn optically connected by (M−1) optical fiber sections 130 to (M−1) 1×Q couplers 150Q each having Q output fibers 160 (the total number output fibers 160, generally designated by P, is (M−1)·Q). One optical fiber section 130R from the 1×M coupler 50M serves as a source reference fiber as described below. Thus, in the example shown, M=Q=4, so that (M−1)=3 and P=(M−1)·Q=3·4=12; there are three 1×4 couplers 50Q that together provide 12 output fibers 160.

The output fibers 160 from the couplers 50Q are optically connected (e.g., spliced) to a corresponding number P of optical fibers ("launch fibers") 170L, which are terminated by a 1×P multifiber connector ("launch connector") 180L. The launch connector 180L has an output side 182L, and the launch fibers 170L have end faces 172L that reside at or proximate to the output side. The launch fibers 170L have respective central axes AFL that run in the z-direction. In an example, the number P of launch fibers 170L equals the number J of jumper fibers 30.

The launch connector 180L is supported by a first movable stage 190L that can move the launch connector by small increments (e.g., down to 1 micron) and with good precision (e.g., to within 0.1 micron or to within 0.05 micron) in at least the two orthogonal directions (i.e., the x and y directions) perpendicular to the optical fiber axes AF (the z-direction). The first movable stage 190L can comprise a pair of piezo-electric stages or stepper stages and can be connected to and controlled by a controller 191.

Thus, in an example the light source system 110 can include the one or more light sources 120, the 1×N switch 140, the 1×M coupler 50M, the 1×Q coupler 50Q, the output fibers 160, the launch fibers 170L, and the launch connector 180L, as well as the optical fiber sections 130. Other configurations for the light source system 110 can also be employed consistent with the goal of generating light 122 of a select wavelength and delivering the light to one or more of the launch fibers 170L, including to all of the launch fibers simultaneously. For example, in an alternative embodiment not shown, a simplified version of the light source system 110 can include a single light source 120 that inputs the light 122 into launch fibers 170L either directly or by using an intervening optical system.

With continuing reference to FIG. 2, the system 100 also includes a first or launch optical imaging head ("launch optical head") 200A and a second or receive optical imaging head ("receive optical head") 200B used to establish non-contact optical communication with the jumper fibers 30 of the test jumper 10, as will be described in greater detail below. The launch optical head 200A has an input end 202A and an output end 204A, while the receive optical head 200B has an input end 202B and an output end 204B. In an example, the input end 202A of the launch optical head 200A is open and resides adjacent the output side 182L of the launch connector 180L. The output end 204A of the launch optical head 200A includes an input connector port 206A into which one of the multifiber connectors 20 of the jumper 10 can be operably engaged (i.e., plugged), thereby establishing this multifiber connector 20 as the input connector.

The input side 202B of the receive optical head 200B includes an output connector port 206B into which the remaining multifiber connector 20 of the jumper 20 can be plugged, thereby establishing this remaining multifiber connector as the output connector. The output end 204B of the receive optical head 200B can be open and resides adjacent a multifiber connector ("receive connector") 180R that is the counterpart to the launch connector 180L. The receive connector 180R is supported by a second movable stage 190R similar to or the same as the first movable stage 190L so that the receive connector can be moved (e.g., scanned) in the same manner as the launch connector 180L, e.g., down to 1 micron increments and with the same precision as the first movable stage 190L.

The receive connector 180R has an input side 182R and supports receive optical fibers 170R that have input end faces 172R at or proximate to the input side. The receive optical fibers 170R also have output end faces 174R that reside adjacent respective detectors 194 (e.g., detector elements) of a detector array 196. In the example shown, for P receive fibers 170R, the detector array 196 has P+1 detectors 194, with the extra detector being optically coupled directly to the light source system 110, e.g., to the output end of the aforementioned source reference fiber 130R via an optical path that does not include the receive connector 180R, to provide a baseline or reference for the amount of optical power being launched into the jumper fibers 30. The direct optical coupling of one of the detectors 194 to the light source system 110 means that a portion of the light 122 generated by the light source system travels straight to the given "P+1" detector 194 without passing through a launch fiber 170L, a jumper fiber 30, or a receive fiber 170R. The detector array 196 is electrically connected to the controller 191. In an example, the number P of receive fibers 170R equals the number) of jumper fibers 30. The receive fibers 170R have respective central axes AFR that run in the z-direction. The "P+1" detector thus serves as a reference detector and is denoted 194R.

The receive connector 180R, the receive fibers 170R supported by the receive connector, and the detector array 196 constitute a detector system 198.

Figure 3A:
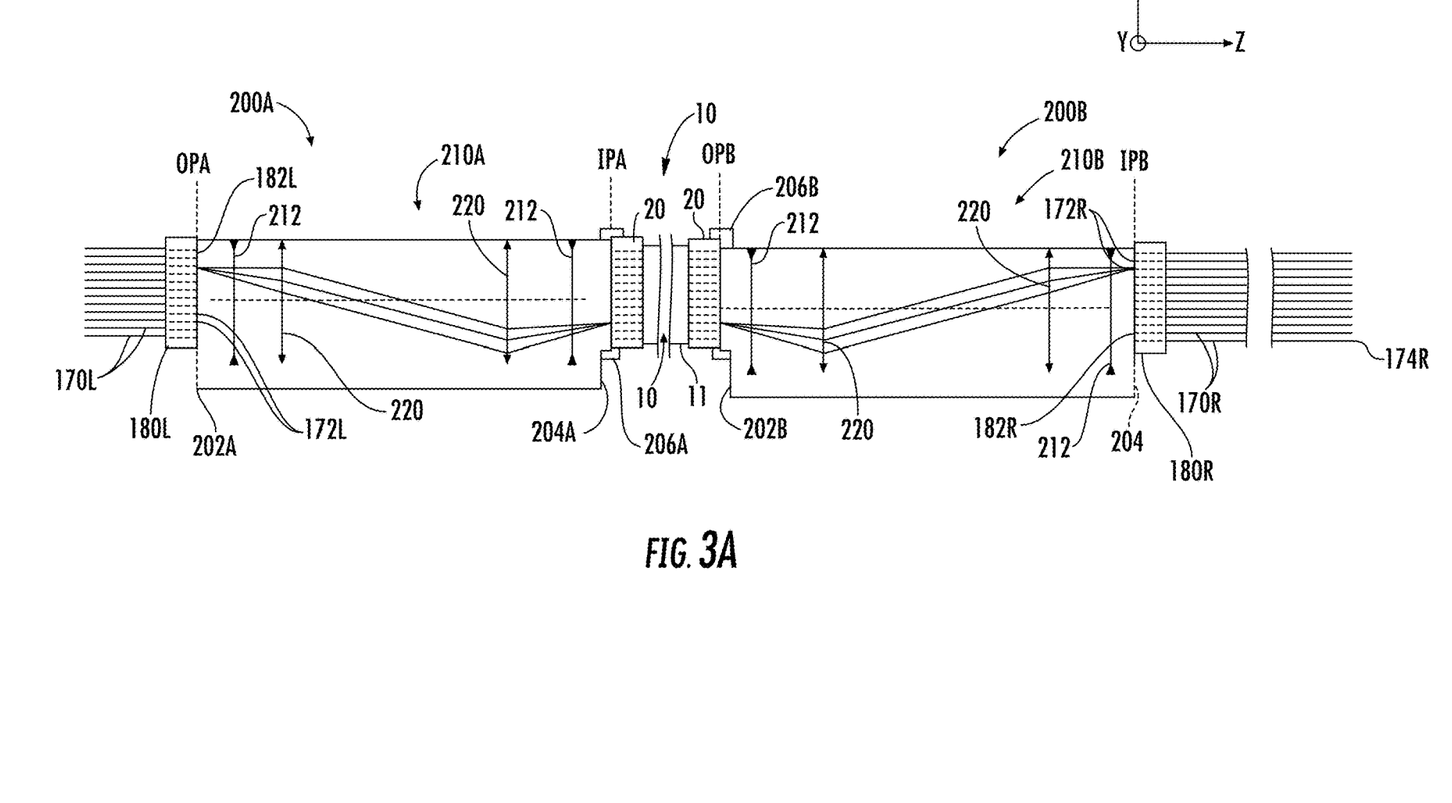
FIG. 3A is a schematic diagram of launch and receive optical heads of the non-contact insertion loss measurement system, with an example jumper operably arranged therebetween.
Figure 3B:
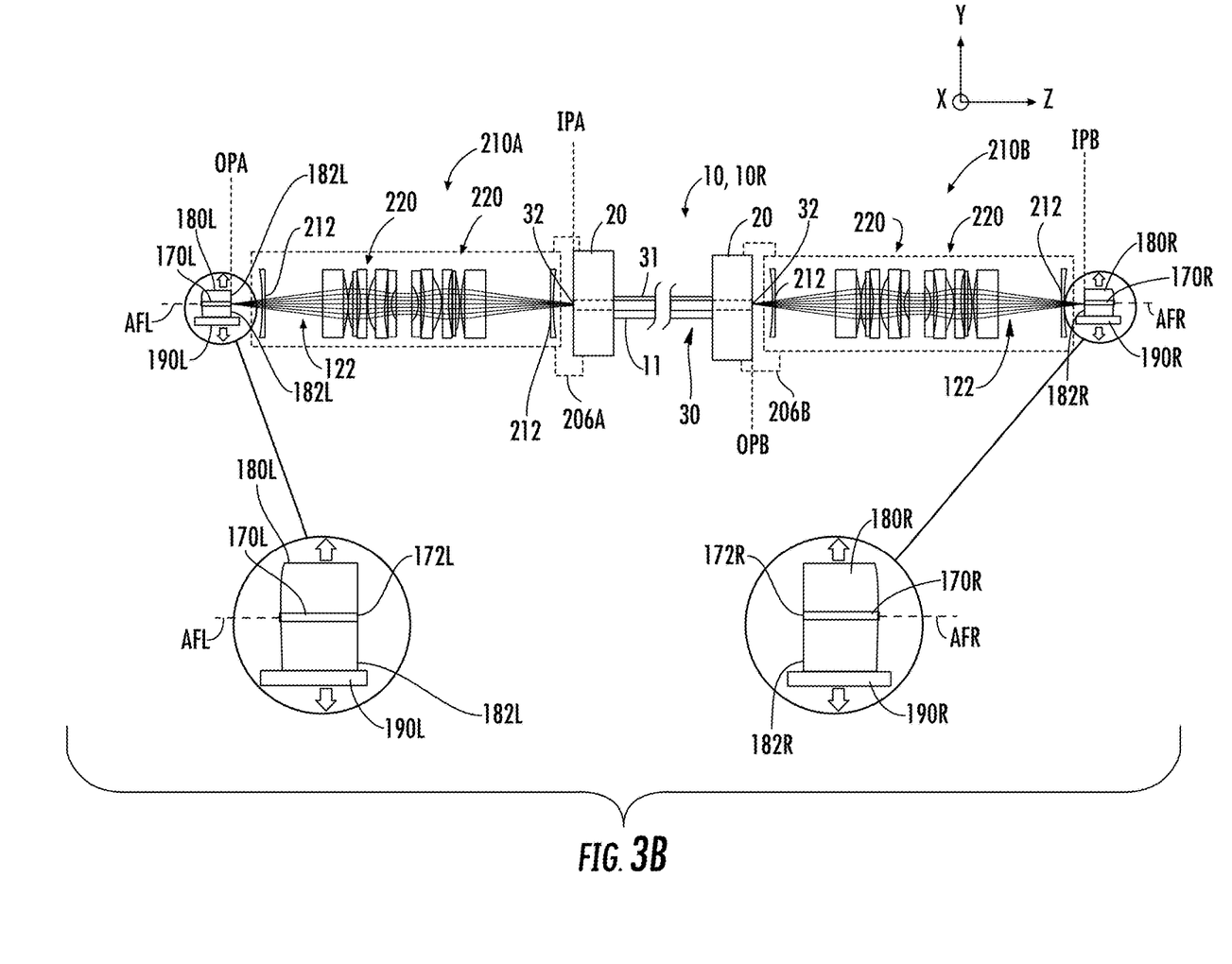
FIG. 3B is a close-up view of example optical system for the launch and receive optical heads of the non-contact insertion loss measurement system of FIG. 3A.

FIG. 3A is a schematic diagram of the launch and receive optical heads 200A and 200B with an example jumper 10 operably arranged therebetween. In an example, the launch and receive optical heads 200A and 200B have the same optical configuration. The launch optical head 200A can comprise a 1:1 telecentric imaging optical system ("launch optical system") 210A, as shown in FIG. 3B. While neither FIG. 3A nor FIG. 3B is exactly to scale, FIG. 3B attempts to a more realistic representation of the relative size of the launch and receive connectors 180L and 180R relative to launch and receive optical systems 210A and 210B.

As a specific example, the launch optical system 210A can include a first negative singlet lens element 212 in close proximity to the output side 182L of the launch connector 180L, a second negative singlet lens element 212 in close proximity to the end surface 24 of the input jumper connector 20 (which is plugged into the input connector port 206A of the launch optical head 200A), and a pair of confronting infinity-corrected microscope objectives 220 between the first and second negative singlet lens elements 212. The launch optical system 210A has an object plane OPA and an image plane IPA.

As noted above, the other jumper connector 20 constitutes the output jumper connector and is plugged into the input connector port 206B of the receive optical head 200B, which has a receive optical system 210B having the same configuration as the launch optical system 210A, but with the object and image planes respectively denoted OPB and IPB.

In system 100, the launch optical head 200A is disposed such that the output side 182L of the launch connector 180L resides substantially at the object plane OPA of the launch optical system 210A, i.e., to within at least a depth of focus of the launch optical system. Likewise, the receive optical head 200B is disposed such that the input side 182R of the receive connector 180R resides substantially at the image plane IPB of the receive optical system 210B, i.e., to within at least the depth of focus of the receive optical system.

The input connector port 206A of the launch optical head 200A is configured so that the end surface 24 of the input jumper connector 20 resides substantially at the image plane IPA of the launch optical system 210A, i.e., to at least within the depth of focus of the launch optical system. Likewise, the output connector port 206B of the receive optical head 200B is configured so that the end surface 24 of the output jumper connector 20 resides substantially at the object plane OPB of the receive optical system 210B, i.e., to at least within the depth of focus of the receive optical system.

The configuration of the system 100 allows for the input and output jumper connectors 20 to be respectively and operably fixed to the launch and receive optical heads 200A and 200B while the launch and receive connectors 180L an 180R can be moved (e.g., scanned) to simultaneously measure the insertion loss associated with each of the jumper fibers 30 (separate insertion loss measurements for the different jumper fibers 30 are made at the same time, i.e., in parallel). The system 100 is configured to mimic the launch conditions of a contact-based system but without the risk of damage associated with the contact-based systems. In an example, the launch optical system 210A is configured to simultaneously image the end faces 172L of the launch fibers 170L onto the corresponding input end faces 32 of the jumper fibers 30 while the receive optical system 210B is configured to simultaneously image the output ends 32 of the jumper fibers onto the corresponding end faces 172R of the receive fibers 170R. Thus, each launch fiber 170L can be associated (e.g., "paired") with a corresponding one of the jumper fibers 30. The same applies to each receive fiber 170R. In this configuration, the detector array 196 can simultaneously detect the optical power for each of the jumper fibers 30 and send the measurements to the controller 191 for processing.

Method of Operation

The method of operation of system 100 for measuring the insertion loss for the jumper fibers 30 of a given test jumper involves performing a calibration process using the reference jumper 10R, followed by performing a measurement process for the test jumper. The calibration and measurement processes are described below with reference to a jumper 10 that has 12 single-mode jumper fibers 30 in a 1×12 configuration.

For single mode fibers, the coupling efficiency between two mode fields is found by evaluation of the following overlap integral:

$$\eta = \frac{\left|\int\int_{-\infty}^{\infty}\psi_1\psi_2^*dxdy\right|^2}{\int\int_{-\infty}^{\infty}\psi_1\psi_1^*dxdy\int\int_{-\infty}^{\infty}\psi_2\psi_2^*dxdy}$$

where $\psi_1$ and $\psi_2$ are the field amplitudes of, for example, the imaged mode field of a launch fiber 170L and the mode field of the corresponding jumper fiber 30, respectively ($\psi_1$ and $\psi_2$ may be referred to herein as "launch field amplitude" and "jumper field amplitude," respectively). The coupling efficiency D is thus the fraction of optical power transferred between these two mode fields. By translating either the launch fibers 170L or the jumper fibers 10 laterally in x and/or y directions (referring to the Cartesian coordinate system in the Figures), the input coupling efficiency $\eta_{IN}$ for each launch fiber 170L/jumper fiber 30 pair can be determined as a function of these lateral offset positions. Likewise, by translating either the receive fibers 170R or the jumper fibers 10 laterally in x and/or y directions, the output coupling efficiency $\eta_{OUT}$ for each jumper fiber 30/receive fiber 170R pair can be determined as a function of these lateral offset positions.

Knowledge of the launch field amplitude $\psi_1$ allows the jumper field amplitude 1:12 to be determined from these measured coupling efficiencies. The shape of the jumper field amplitude 1:12 gives the center location as well as the MFD of the associated jumper fiber 30. In this way, for each of the jumper fibers 30, the lateral offset from the ideal position can be found and its contribution to the total insertion loss calculated. In addition, the MFD mismatch between the launch and receive fibers 170L and 170R associated with each of the jumper fibers 30 can be determined and used to correct for a small (~0.03 dB) insertion loss measurement error for each jumper fiber.

1. Calibration Procedure

The calibration procedure is performed using the aforementioned reference or golden jumper 10R for which the intrinsic loss, core offset, and mode field diameter (MFD) associated with each reference jumper fiber 30R has been accurately determined. The calibration process can be performed as often as before and/or after every time a test jumper 10 is measured. In practice, the calibration procedure can be performed less frequently, e.g. after every tenth or even after every hundredth test jumper measurement. The description that follows describes the analysis for a single launch fiber 170L, the corresponding jumper fiber 30R in the reference jumper 10R, and the corresponding receive fiber 180L. The analysis is the same for each jumper fiber 30 in the reference jumper 10R, and the measurements and analysis can be performed simultaneously (i.e., in parallel) on all of the jumper fibers 30R of the reference jumper 10R. The example calibration process can be broken down into the following main steps.

The first step involves plugging one jumper connector 20 of the reference jumper 10R into the input connector port 206A of the launch optical head 200A and plugging the other jumper connector 20 of the reference jumper into the output connector port 206B of the receive optical head 200B. This defines the input and output connectors 20 of the reference jumper 10R.

The second step involves selecting a light source 120 to be used and to direct the light 122 from the light source the launch fibers 170L of the launch connector 180L using the light source system 110, e.g., via the intervening optical fiber sections 130 and the 1×N switch 140, the 1×M coupler 150M, and the 1×Q coupler 150Q for the example light source system shown in FIG. 2. This step also includes directing a portion of the light 122 to the "P+1" reference detector 194R via the source reference fiber 130R.

The third step involves scanning the launch connector 180L and thus the launch fibers 170L supported therein in an x-y plane (i.e., laterally moving the launch connector 180L and the launch fibers 170L supported therein in two orthogonal directions) and relative to the input jumper connector 20 and the corresponding reference jumper fiber 30R ("selected reference jumper fiber 30R") supported therein. This is accomplished using the first movable stage 190L. This step also includes measuring the power at the corresponding detectors 194 in the detector array 196. In this step, the receive connector 180R supported by the second movable stage 190R remains stationary. The home or starting location need not be exactly at the zero offset position between the launch fibers 170L and the reference jumper fibers 30R. The scanning can be performed for example over a 20 μm×20 μm region with a step size of 1 μm, thereby generating 400 data points for each reference jumper fiber 30R. For each power reading, the data is corrected by dividing it by the power measured by the reference detector 194R to arrive at a first power measurement distribution P1(x,y) for each reference jumper fiber 30R. The controller 191 can be used to track the power measurements as a function of the (x, y) position of the first movable stage 190L and thus as a function of positions of the given launch fiber 170L ("selected launch fiber").

The fourth step involves scanning the receive connector 180R and relative to the output jumper connector 20, which results in the receive fibers 170R being moved relative the selected reference jumper fibers 30R. This is accomplished using the second movable stage 190R. This step also includes measuring the power at the corresponding detectors 194 in the detector array 196. The scanning range and increments can be the same as for the scan of the launch connector 180L. The result is a second power distribution measurement P2(x,y) for each reference jumper fiber 30R. The controller 191 can be used to track the power measurements as a function of the position of the second movable stage 190R and thus as a function of the (x, y) position of the corresponding receive fiber 170R ("selected receive fiber 170R").

The fifth step involves processing the first power measurements P1(x,y) from the third step. In an example, this includes determining a maximum power measurement $P1_{MAX}$ and discarding measurements that fall below a threshold value (e.g., 40%) as measured relative to the maximum power measurement. A centroid (first moment calculation) is performed on the remaining data points to determine the center of the power distribution of the first power measurement P1(x,y).

The known magnitude and direction of the offset of the selected reference jumper fiber 30R of the reference jumper 10R can be used in combination with the centroid location data to calibrate the measurement system. In other words, the point in space which corresponds to zero offset for the selected launch fiber 170L can be determined.

The sixth step involves converting the (x, y) data points (power measurements) to r-values by calculating $r=\mathrm{sqrt}(x^2+y^2)$, in which the r-values represent the distance from the centroid point to each (x, y) data point. This step results in amplitude (power) vs. r-values that represent a convolution of the mode fields of the selected launch fiber 170L and the selected receive fiber 170R and so is referred to as "convolution data."

The seventh step involves comparing the convolution data obtained in step 6 with a subset of a database (or "lookup table") that contains calculated convolution data for every possible pairing of MFDs given the type of optical fiber used to make jumpers. The subset of this database contains all those data sets in which one of the mode fields is the same as the mode field of the reference jumper 10R. Each calculated convolution from this subset of the database is compared with the measured data by scaling the calculated convolution data in amplitude to obtain the minimum least squares error. The MFD of the calculated data with the smallest least squares error is the MFD of the selected launch fiber 170L. Below, this matching of the measured data to the calculated data is referred to as the "curve fit."

In another example, the MFD is found by performing a deconvolution using the measured convolution data and the known mode field shape of the selected reference jumper fiber 30R of the reference jumper 10R instead of relying on a lookup table. However, using a look-up table is straightforward and works particularly well with noisy data.

The eighth step involves repeating the fifth through seventh steps for the second set of measurement data P2(x,y) obtained in step four to find the point in space corresponding to zero offset of the selected receive fiber 170R and the MFD of the selected receive fiber.

The ninth step involves using the first and second sets of power measurement data and the corresponding calculated convolution data to determine an amount of referenced power $P_{launch}$ launched by the launch optical head 200A. This can be accomplished using the following equation:

$$P_{launch} = P_{det}/[P_{off1} \cdot P_{w1} \cdot P_{IL} \cdot P_{off2} \cdot P_{w2}]$$

wherein $P_{det}$ is the ratio of the power detected at the given detector 194 to the reference power as detected by the reference detector 194R; $P_{off1}$ is the ratio of the power (determined from the curve fit of first power measurement data) at the offset value determined in the fifth step to the power at zero offset using this same curve fit; $P_{w1}$ is the fractional loss caused by MFD mismatch between the selected launch fiber 170L and the selected/corresponding reference jumper fiber 30R. This loss, depending on the amount of the MFD difference, is obtained from a calculated lookup table; $P_{IL}$ is the fractional loss caused by the reference jumper 10R and is an internal loss and as such does not include the loss caused by an offset error or a mismatch of MFDs; $P_{off2}$ is the ratio of the power at a "certain" offset distance using the curve fit of the second power measurement data to the zero offset result using the same curve fit, wherein the "certain" offset distance is the magnitude of the vector sum of the vector from a home position to the perfect (zero offset) point and the vector from a perfect (zero offset) point to the centroid point; and $P_{w2}$ is the fractional loss caused by the MFD mismatch between the selected receive fiber 170R and the selected/corresponding reference jumper fiber 30R. This loss, depending on the amount of mode field difference, is obtained from a calculated lookup table.

With the knowledge of the ideal or perfect offset points for the launch and receive fibers 170L and 170R respectively associated with the launch and receive optical heads 200A and 200B, along with the MFDs of the launch and receive optical heads and the (referenced) launch power $P_{launch}$, the calibration procedure is complete.

As noted above, the calibration procedure can be performed in parallel on all of the reference jumper fibers 30R. The calibration procedure can also be performed step-wise, i.e., in series using one reference jumper fiber 30R at a time.

Measurement of a Test Jumper

The measurement of a test jumper 10 is similar to the calibration process described above and in fact follows the first through eighth steps as described above but with the test jumper 10 instead of the reference jumper 10R.

In the ninth step, the fraction power loss $P_{IL}$ is calculated using the following equation:

$$P_{IL} = P_{det}/[P_{off1} \cdot P_{w1} \cdot P_{launch} \cdot P_{off2} \cdot P_{w2}]$$

In the tenth step, the total insertion loss $IL_{total}$ for the test jumper 10 is given by:

$$IL_{total} = P_{off1} \cdot P_{w1} \cdot P_{IL} \cdot P_{off2} \cdot P_{w2}$$

which is referenced to the MFD mismatches between the MFDs of the launch and receive fibers 170L and 170R, and the corresponding MFDs of the jumper fiber 30 at the input and output connectors 20. Different mode mismatch factors $P_{w1}$ and $P_{w2}$, can be substituted to determine the insertion loss relative to launch and receive fibers 170L and 170R having different MFDs.

Insertion Loss Measurement Using Input and Output Coupling Efficiencies

The insertion loss measurement method can also be carried out using the input and output coupling efficiencies $\eta_{IN}+\eta_{OUT}$ as follows: a) performing a calibration using a reference jumper 10R having at least one reference jumper fiber 30R that contributes to the insertion loss IL an amount of fractional loss $P_{IL}$, to determine: i) a launch MFD and a launch zero offset position; ii) a receive MFD and a receive zero offset position; and iii) an amount of launch power, wherein the reference jumper 10R contributes to the insertion loss IL an amount of loss $P_{IL}$; b) determining for the at least one test jumper fiber 30 an input MFD and an output MFD and input and output lateral offsets without the input and output ends 32 of the at least one test jumper fiber making physical contact with any other optical fibers; c) using the information of act d), calculating a difference between the input MFD and the launch MFD to determine an input coupling efficiency $\eta_{IN}$ that includes a first amount of lateral offset loss, and calculating a difference between the output MFD and the receive MFD to determine an output coupling efficiency $\eta_{OUT}$ that includes a second amount of lateral offset loss; and d) calculating the insertion loss $IL=\eta_{IN}+\eta_{OUT}+P_{IL}$ for the at least one test jumper fiber.

The above method can be performed simultaneously on multiple reference jumper fibers 30R and then on multiple test jumper fibers 30. In an example, single test jumper fibers 30 can be illuminated beforehand to check the polarity of the cable assembly 30 to determine which launch fiber 170L and which receive fiber 170R corresponds to which jumper fiber 30.

Jumpers with Multimode Jumper Fibers

The calibration and measurement procedures for a jumper 10 having multimode jumper fibers 30 is the same as for single-mode fiber except that the steps where the MFD is determined and the terms in the equations involving the MFD are omitted. This is because a multimode fiber does not have a "mode field," although it does have a near field intensity distribution. Any variation of this near field intensity distribution from fiber to fiber is not explicitly taken into account; however, its impact on the fiber loss is included in the $P_{IL}$ term.

It will be apparent to those skilled in the art that various modifications to the preferred embodiments of the disclosure as described herein can be made without departing from the spirit or scope of the disclosure as defined in the appended claims.

Thus, the disclosure covers the modifications and variations provided they come within the scope of the appended claims and the equivalents thereto.

What is claimed is:

1. A non-contact system for measuring an insertion loss of a cable assembly having at least one optical fiber with input and output end faces respectively supported by input and output connectors, the non-contact system comprising:
   a light source system that includes at least one light source that emits light, at least one launch fiber optically coupled to the at least one light source, and a launch connector supporting the at least one launch fiber, wherein each of the at least one launch fiber includes an output end face at the launch connector;
   a detector system that includes at least one receive fiber having an input end face and an output end face, a receive connector supporting the input end face of the at least one receive fiber, and a detector array comprising a plurality of detectors, wherein at least one of the detectors is optically coupled to the output end face of the at least one receive fiber and at least another one of the detectors is optically coupled to the light source system via an optical path that does not include the receive connector;
   a first movable stage that supports the launch connector;
   a second movable stage that supports the receive connector;
   a launch optical head including an input connector port configured to receive and engage the input connector, wherein the launch optical head comprises a 1:1 telecentric imaging optical system for imaging the output end face of the at least one launch fiber onto the input end face of the at least one optical fiber of the cable assembly; and
   a receive optical head including an output connector port configured to receive and engage the output connector, wherein the launch optical head comprises a 1:1 telecentric imaging optical system for imaging the output end face of the at least one optical fiber of the cable assembly onto the input end face of the at least one receive fiber.

2. The non-contact system according to claim 1, wherein the at least one light source comprises a first laser that emits the laser light at first wavelength and a second laser that emits the laser light at a second wavelength that is less than the first wavelength.

3. The non-contact system according to claim 2, where the first wavelength is about 1550 nm and the second wavelength is about 1310 nm.

4. The non-contact system according to claim 2, wherein the first and second lasers are optically coupled to the at least one launch fiber using first and second optical fiber sections.

5. The non-contact system according to claim 1, wherein the cable assembly comprises a number J of optical fibers, the at least one launch fiber comprises a number P of launch fibers, and the at least one receive fiber comprises a number P receive fibers, wherein P=J, and wherein the first and second movable stages are respectively configured to move the launch and receive connectors relative to the launch and receive optical heads respectively to measure the insertion loss for each of the J optical fibers.

6. The non-contact system according to claim 1, wherein the first and second movable stages are configured to move in increments of 1 micron or less.

7. The non-contact system according to claim 1, wherein the imaging optical system of the launch optical head and the imaging optical system of the receive optical head each comprises first and second confronting microscope objectives.

8. A non-contact system for measuring an insertion loss of a test cable assembly having multiple test optical fibers respectively supported by input and output connectors, the multiple test optical fibers each having input and output end faces at the respective input and output connectors, the non-contact system comprising:
   a light source system comprising a launch connector that supports multiple launch fibers each having an output end face, wherein the light source system is configured to generate light at a select wavelength and input the light into the multiple launch fibers;
   a detector system comprising a receive connector that supports multiple receive fibers each having input and output end faces, and further comprising a plurality of detectors respectively optically coupled to the output end faces of the receive optical fibers, and a reference detector optically coupled directly to the light source system;
   first and second movable stages for respectively supporting and moving the launch and receive connectors;
   a launch optical head including an input connector port configured to receive and engage the input connector, wherein the launch optical head comprises a 1:1 telecentric imaging optical system for respectively imaging the output end faces of the multiple launch fibers onto the respective input end faces of the multiple test optical fibers; and
   a receive optical head including an output connector port configured to receive and engage the output connector, wherein the launch optical head comprises a 1:1 telecentric imaging optical system for respectively imaging the output end faces of the multiple test optical fibers onto the input end faces of the receive optical fibers.

9. The non-contact system according to claim 8, wherein the light source system comprises one or more lasers, with at least one of the lasers generating the light at a wavelength in the range from about 1310 nm to about 1550 nm.

10. The non-contact system according to claim 8, wherein the first and second movable stages can move laterally in increments of down to 1 micron or less with an accuracy of 0.1 micron or less.

11. The non-contact system according to claim 8, wherein the imaging optical system of the launch optical head and the imaging optical system of the receive optical head each comprises first and second confronting microscope objectives.

12. A non-contact system for measuring insertion loss, comprising:
- a cable assembly having multiple cable fibers each having input and output end faces respectively supported by input and output connectors;
- a light source system that emits light and comprises a launch connector that supports multiple launch fibers, wherein each of the multiple launch fibers includes an output end face at the launch connector;
- a detector system comprising a receive connector that supports multiple receive fibers each having an input end face and an output end face, and further comprising a plurality of detectors respectively optically coupled to the output end faces of the receive fibers, with one of the detectors optically coupled to the light source system via an optical path that does not include the receive connector;
- a first movable stage that supports the launch connector;
- a second movable stage that supports the receive connector;
- a launch optical head including an input connector port configured to receive and engage the input connector, wherein the launch optical head comprises a 1:1 telecentric imaging optical system configured to respectively image the output end faces of the launch fibers onto the input end faces of the multiple cable fibers when the input connector is arranged adjacent the launch optical head; and
- a receive optical head including an output connector port configured to receive and engage the output connector, wherein the launch optical head comprises a 1:1 telecentric imaging optical system configured to respectively image the output end faces of the multiple cable fibers onto the input end faces of the receive fibers when the output connector is arranged adjacent the receive optical head.

13. The non-contact system according to claim 12, wherein the light source system comprises a first laser that emits light at first wavelength and a second laser that emits light at a second wavelength that is less than the first wavelength.

14. The non-contact system according to claim 13, where the first wavelength is about 1550 nm and the second wavelength is about 1310 nm.

15. The non-contact system according to claim 12, wherein the first and second movable stages are cable of moving in increments of down to 1 micron or less.

16. The non-contact system according to claim 12, wherein the imaging optical system of the launch optical head and the imaging optical system of the receive optical head each comprises first and second confronting microscope objectives.

* * * * *